(12) United States Patent
Hersh et al.

(10) Patent No.: US 11,093,210 B2
(45) Date of Patent: Aug. 17, 2021

(54) WIRELESS HANDHELD AUDIO CAPTURE DEVICE AND MULTI-VOCALIST METHOD FOR AUDIOVISUAL MEDIA APPLICATION

(71) Applicant: SMULE, INC., San Francisco, CA (US)

(72) Inventors: Benjamin Hersh, San Francisco, CA (US); John Shimmin, San Francisco, CA (US); Jeannie Yang, San Francisco, CA (US); Perry R. Cook, Jacksonville, OR (US)

(73) Assignee: Smule, Inc., San Francisco, CA (US)

( * ) Notice: Subject to any disclaimer, the term of this patent is extended or adjusted under 35 U.S.C. 154(b) by 0 days.

(21) Appl. No.: 15/337,891

(22) Filed: Oct. 28, 2016

(65) Prior Publication Data
US 2017/0123755 A1    May 4, 2017

Related U.S. Application Data

(60) Provisional application No. 62/247,743, filed on Oct. 28, 2015.

(51) Int. Cl.
*G06F 3/16* (2006.01)
*G06F 3/01* (2006.01)
*G10H 1/36* (2006.01)
*G06F 1/16* (2006.01)
*H04M 1/72412* (2021.01)
(Continued)

(52) U.S. Cl.
CPC ............ *G06F 3/165* (2013.01); *G06F 1/1694* (2013.01); *G06F 3/017* (2013.01); *G10H 1/361* (2013.01); *G10H 1/368* (2013.01); *H04M 1/72412* (2021.01); *G10L 21/013* (2013.01); *G10L 25/57* (2013.01); *H04M 1/72442* (2021.01)

(58) Field of Classification Search
CPC ........ G06F 3/165; G06F 3/0416; G06F 3/017; G06F 1/1694; G10H 1/361; G10H 1/368; H04M 1/03; H04M 1/72412; H04M 1/72442; G10L 21/013; G10L 25/57
See application file for complete search history.

(56) References Cited

U.S. PATENT DOCUMENTS

2006/0292537 A1* 12/2006 Nute ........................ G09B 5/06
434/307 A
2007/0065794 A1    3/2007 Mangum
(Continued)

FOREIGN PATENT DOCUMENTS

KR    10-2006-0057757    5/2006

OTHER PUBLICATIONS

PCT International Search Report /Written Opinion of International Search Authority for counterpart application, dated Feb. 10, 2017, of PCT/US2016/059531.

*Primary Examiner* — Justin R. Blaufeld
(74) *Attorney, Agent, or Firm* — Haynes and Boone, LLP

(57) ABSTRACT

Embodiments described herein relate generally to systems comprising a display device, a display device-coupled computing platform, a mobile device in communication with the computing platform, and a content server in which methods and techniques of capture and/or processing of audiovisual performances are described and, in particular, description of techniques suitable for use in connection with display device connected computing platforms for rendering vocal performance captured by a handheld computing device.

16 Claims, 6 Drawing Sheets

(51) Int. Cl.
　　　*G10L 25/57*　　　(2013.01)
　　　*G10L 21/013*　　(2013.01)
　　　*H04M 1/72442*　(2021.01)

(56) References Cited

U.S. PATENT DOCUMENTS

| | | |
|---|---|---|
| 2007/0287141 A1 | 12/2007 | Milner |
| 2008/0311969 A1* | 12/2008 | Kay .................. G10H 3/146 |
| | | 463/7 |
| 2009/0038468 A1* | 2/2009 | Brennan ............. G10H 1/368 |
| | | 84/609 |
| 2009/0100988 A1* | 4/2009 | Villa .................. G10H 1/0091 |
| | | 84/601 |
| 2009/0123899 A1* | 5/2009 | Bates .................. G10H 1/368 |
| | | 434/307 R |
| 2010/0304810 A1* | 12/2010 | Stoddard ............. A63F 13/814 |
| | | 463/7 |
| 2011/0144982 A1* | 6/2011 | Salazar ............... G10L 21/0356 |
| | | 704/207 |
| 2011/0251842 A1* | 10/2011 | Cook .................. G10H 1/366 |
| | | 704/207 |
| 2013/0109310 A1* | 5/2013 | Mine .................. G06F 3/0488 |
| | | 455/41.1 |
| 2014/0006944 A1* | 1/2014 | Selig .................. G06F 9/453 |
| | | 715/705 |
| 2015/0056920 A1 | 2/2015 | Huttunen et al. |
| 2015/0235098 A1* | 8/2015 | Lee .................... G06K 9/0002 |
| | | 715/709 |
| 2015/0255082 A1 | 9/2015 | Cook et al. |
| 2015/0301796 A1* | 10/2015 | Visser ................. G10L 15/22 |
| | | 715/728 |
| 2016/0011850 A1* | 1/2016 | Sheen ................. G06F 3/162 |
| | | 715/709 |

* cited by examiner

WIRELESS HANDHELD AUDIO CAPTURE DEVICE AND MULTI-VOCALIST METHOD FOR AUDIOVISUAL MEDIA APPLICATION

CROSS-REFERENCE TO RELATED APPLICATION(S)

The present application is also related to commonly-owned, co-pending, U.S. application Ser. No. 15/337,866, filed on even date herewith, entitled "Audiovisual Media Application Platform with Wireless Handheld Audiovisual Input," and naming Benjamin Hersh, John Shimmin, Jeannie Yang, and Perry R. Cook as inventors. Each of the foregoing applications is incorporated herein by reference.

BACKGROUND

Field of the Invention

The invention(s) relate generally to capture, processing and/or rendering of audiovisual performances and, in particular, to techniques suitable for use in connection with display device-connected (or integrated) computing platforms, handheld computing devices, and graphical user interfaces therefor.

Description of the Related Art

The installed base of mobile phones, personal media players and other portable computing devices grows in sheer number and computational power each day. Hyper-ubiquitous and deeply entrenched in the lifestyles of people around the world, these devices transcend nearly every cultural and economic barrier. Computationally, the portable computing devices of today offer speed and storage capabilities comparable to desktop or workstation computers from less than ten years ago, rendering them surprisingly suitable for real-time sound synthesis and other musical applications. Partly as a result, some modern devices, such as iPhone®, iPad®, iPod Touch® and other iOS® or Android devices, support audio and video processing quite capably, while at the same time providing platforms suitable for advanced user interfaces. Indeed, applications such as the Smule Ocarina™, Leaf Trombone®, I Am T-Pain™, AutoRap®, Sing! Karaoke™, Guitar! By Smule®, and Magic Piano® apps available from Smule, Inc. have shown that advanced digital acoustic techniques may be delivered using such devices in ways that provide compelling musical experiences.

Devices having AirPlay® modes of operation popularized by Apple, Inc. have been used to wirelessly mirror content to television displays, thereby providing a larger screen experience for content and features available from using a mobile phone. For example, an Apple TV™ set top box may be connected to a standard television or other display device to provide such mirroring. Apple TV devices, as well as competitive TV-connected media streaming devices, may support retrieval and rendering of content from a network, as well as the execution of games, entertainment applications, etc. iPhone®, iPad®, iPod Touch®, AirPlay®, Bonjour®, and Apple TV are trademarks of Apple Inc. iOS® is a trademark of Cisco Technology, Inc. Android is a trademark of Google Inc.

As researchers seek to transition their innovations to commercial applications deployable to modern handheld devices and media application platforms within the real-world constraints imposed by processor, memory and other limited computational resources thereof and/or within communications bandwidth and transmission latency constraints typical of wireless networks, significant practical challenges present. Improved techniques and functional capabilities are desired, particularly relative to audiovisual content and user interfaces.

SUMMARY

It has been discovered that, despite many practical limitations imposed by mobile device platforms and application execution environments, audiovisual performances, including vocal music, may be captured and coordinated with those of other users in ways that create compelling user experiences. In some cases, the vocal performances of individual users are captured (together with performance synchronized video) on mobile devices in the context of a karaoke-style presentation of lyrics in correspondence with audible renderings of a backing track. In some cases, vocal performances of individual users are captured by mobile devices connected to or coupled with a display device-connected computing platform, in which case the display device-connected computing platform may perform the rendering of the karaoke-style presentation of lyrics in correspondence with audible renderings of a backing track. In some cases, pitch cues may be presented to vocalists in connection with the karaoke-style presentation of lyrics and, optionally, continuous automatic pitch correction (or pitch shifting into harmony) may be provided.

In some cases, the mobile device may perform the automatic pitch correction or pitch shifting, while in other cases, the pitch correction or pitch shifting is performed by the display device-connected computing platform or some combination of the two devices. Contributions of multiple vocalists may be coordinated and mixed in a manner that selects for presentation, at any given time along a given performance timeline, performance synchronized video of one or more of the contributors. Selections are typically in accord with a visual progression that codes a sequence of visual layouts in correspondence with other coded aspects of a performance score such as pitch tracks, backing audio, lyrics, sections and/or vocal parts. The number, visual arrangement and sizing of individual visual cells in such layouts may vary throughout the course of a given coordinated performance.

In some cases, a device pairing protocol may be employed using wireless local area network (WLAN) or personal area network (PAN) communications, near-field communications (NFC) or even optical or acoustic registrations or signals to associate one or more mobile devices (e.g., phones or portable media devices) with a display device coupled computing platform that hosts a karaoke-style media application. In this way, the associated mobile devices may provide an entertainment system with vocal audio capture (and in some cases performance synchronized video capture) as part of a collaborative, group-oriented, karaoke-style social interaction.

Bonjour® implementations of zero-configuration networking or other similar technologies that provide service discovery, address assignment, and/or hostname resolution may be employed the context of local area networks as part of a link layer solution in an internet protocol (IP) traffic-bearing environment such as Wi-Fi. However, additional application layer integration such as for on-off microphone (live vs. mute), volume, audio effects, reverberation and/or other controls can also be provided to facilitate usage in coordination with karaoke-style presentation and advance of lyrics, audible rendering of backing tracks, etc. In addition, in some cases or embodiments, pitch correction (e.g., to nearest note in a current key or based on score-coded temporally synchronized note targets) may be provided as part of vocal capture signal processing at the mobile device or may be supported with application layer controls of media application signal processing hosted at the display device-connected computing platform. In some cases or embodiments, pairing operations may direct a user to orient a paired mobile device in a manner that enhances its efficacy for audio capture and may employ accelerometer and/or gyroscopic devices provided on-board the mobile device to determine or monitor proper orientation.

In some embodiments in accordance with the present invention(s), a method includes using a portable computing device as a wirelessly coupled audio capture interface for a display device-coupled computing platform, and detecting, at least for audio capture modes of operation, an orientation of the portable computing device, and in response to at least some detected orientations, displaying on a touchscreen of the portable computing device an indication to the user of the portable computing device to reorient the portable computing device from a generally right-side-up orientation to a generally upside-down orientation. The generally upside-down orientation orients the microphone toward the user's mouth.

In some embodiments, the orientation detecting is via one or more of a gyroscopic sensor and an accelerometer of the portable computing device. In some embodiments, the method further includes displaying, in the generally right-side-up orientation, first display content including the indication to reorient the portable computing device and, responsive to detection of a change in orientation of the portable computing device, displaying in the generally upside-down orientation, second display content including one or more user interface controls for audio capture. In some embodiments, transition from the first display content to the second display content includes a rotational transformation of at least some visual feature of first display content. In some embodiments, the indication to reorient includes a dynamic on-screen visual of complementary semi-circular arrows.

In some embodiments, the one or more user interface controls for audio capture include an on-off switch-type user interface control and, responsive to user gestures on the touchscreen, an operating mode changes between (i) a first user interface state wherein captured vocal audio is transmitted to the display device-coupled computing platform over the wireless network and (ii) a second user interface state wherein vocal audio is not transmitted.

In some embodiments, the method further includes capturing, via a microphone of the portable computing device, vocal audio from a user of the portable computing device; and visually rendering, on the touchscreen display of the portable computing device, cues corresponding to the amplitude of the captured vocal audio.

In some embodiments in accordance with the present invention(s), a computer program product is encoded in non-transitory media and including instructions executable in connection with any of the foregoing methods to detect orientation of the portable computing device and to wirelessly transmit captured vocal audio to the display device-coupled computing platform.

In some embodiments in accordance with the present inventions, a method includes using a touchscreen-enabled portable computing device in a generally upside-down orientation as a wirelessly coupled audio capture interface for a display device-coupled computing platform, wherein the generally upside-down orientation presents the microphone toward the user's mouth; and capturing a vocal audio stream using the microphone of the portable computing device and, via a wireless network, transmitting the captured vocal audio stream to a media application executing on the display device-coupled computing platform for use as an audio input thereof.

In some embodiments, the method further includes pairing (prior to the capturing) the touchscreen-enabled portable computing device and the display device-coupled computing platform for communications over the wireless network. In some embodiments, the method further includes detecting, using one or more of an accelerometer and a gyroscope of the portable computing device, an orientation of the portable computing device and, responsive to a detected change in orientation, transitioning to the vocal capture. In some embodiments, the method further includes displaying, on the touchscreen of the portable computing device, an on-off switch-type user interface control and, responsive to user gestures on the touchscreen, changing between (i) a first user interface state wherein the captured vocal audio stream captured is transmitted to the computing platform over the wireless network and (ii) a second user interface state wherein the vocal audio stream is not transmitted.

In some embodiments, the method further includes pitch correcting, at the portable computing device, captured vocals prior to transmitting the captured vocal audio stream to the display device-coupled computing platform. In some embodiments, the method further includes pitch correcting (at the display device-coupled computing platform) the captured vocal audio stream transmitted from the portable computing device; and audibly rendering, at the display device-coupled computing platform, the pitch-corrected vocal audio stream.

In some embodiments, the audible rendering includes vocals of an additional vocalist other than the user, and the method further includes visually displaying on a display coupled to the display device-coupled computing platform performance synchronized video of the additional vocalist. In some embodiments, the method further includes displaying, on the touchscreen of the portable computing device, an audio reverberation user interface control; and responsive to user gestures on the touchscreen and to a resulting state of the audio reverberation user interface control, changing signal processing applied to the vocal audio stream at either or both of the portable computing device and the display device-coupled computing platform. In some embodiments, the method further includes displaying, displaying, on the touchscreen of the portable computing device, an audio volume user interface control; and responsive to user gestures on the touchscreen and to a resulting state of the audio volume user interface control, changing signal processing applied to the vocal audio stream at either or both of the portable computing device and the display device-coupled computing platform. In some embodiments, the method further includes displaying, displaying, on the touchscreen of the portable computing device, an audio effects user interface control; and responsive to user gestures on the touchscreen and to a resulting state of the audio effects user interface control, changing signal processing applied to the vocal audio stream at either or both of the portable computing device and the display device-coupled computing platform.

In some embodiments in accordance with the present invention(s), a method includes browsing screen indications respectively corresponding to a plurality of collaboration participants on a user interface of a display device-coupled computing platform, the user interface controllable using a handheld pointing device; capturing, via the pointing device, a user gesture indicative of selection of a first collaboration participant; responsive to selection of the first collaboration participant, initiating audiovisual rendering of a first audiovisual performance associated with the first collaboration participant using the display device-coupled computing platform; and responsive to selection of a second collaboration participant, transitioning from the audiovisual rendering of the first audiovisual performance to audiovisual rendering of a second audiovisual performance associated with the second collaboration participant, wherein the first and second audiovisual performances are each synchronized to a common backing track and wherein the transitioned-to second audiovisual performance continues from a point therein that corresponds to a transitioned-from point in first audiovisual performance.

In some embodiments, the screen indications for at least some of the plurality of collaboration participants are visually overlaid on a visual depiction of a globe background in correspondence with a respective geographic location of one of the associated audiovisual performance or the collaboration participant. In some embodiments, the screen indications for at least some of the plurality of collaboration participants are visually arranged in user selection array, wherein the user gesture indicative of selection includes a swipe gesture, and wherein a particular collaboration participant is selected based on a visually centered one of the screen indications.

In some embodiments, the method further includes rotating the globe background in correspondence with movement of a cursor controlled by the handheld pointing device In some embodiments, the method further includes visually depicting (in correspondence with the audible rendering) an emanation from the screen indication of the currently selected collaboration participant.

These and other embodiments in accordance with the present invention(s) will be understood with reference to the description and appended claims which follow.

BRIEF DESCRIPTION OF THE DRAWINGS

The present invention is illustrated by way of example and not limitation with reference to the accompanying figures, in which like references generally indicate similar elements or features.

Figure 1:
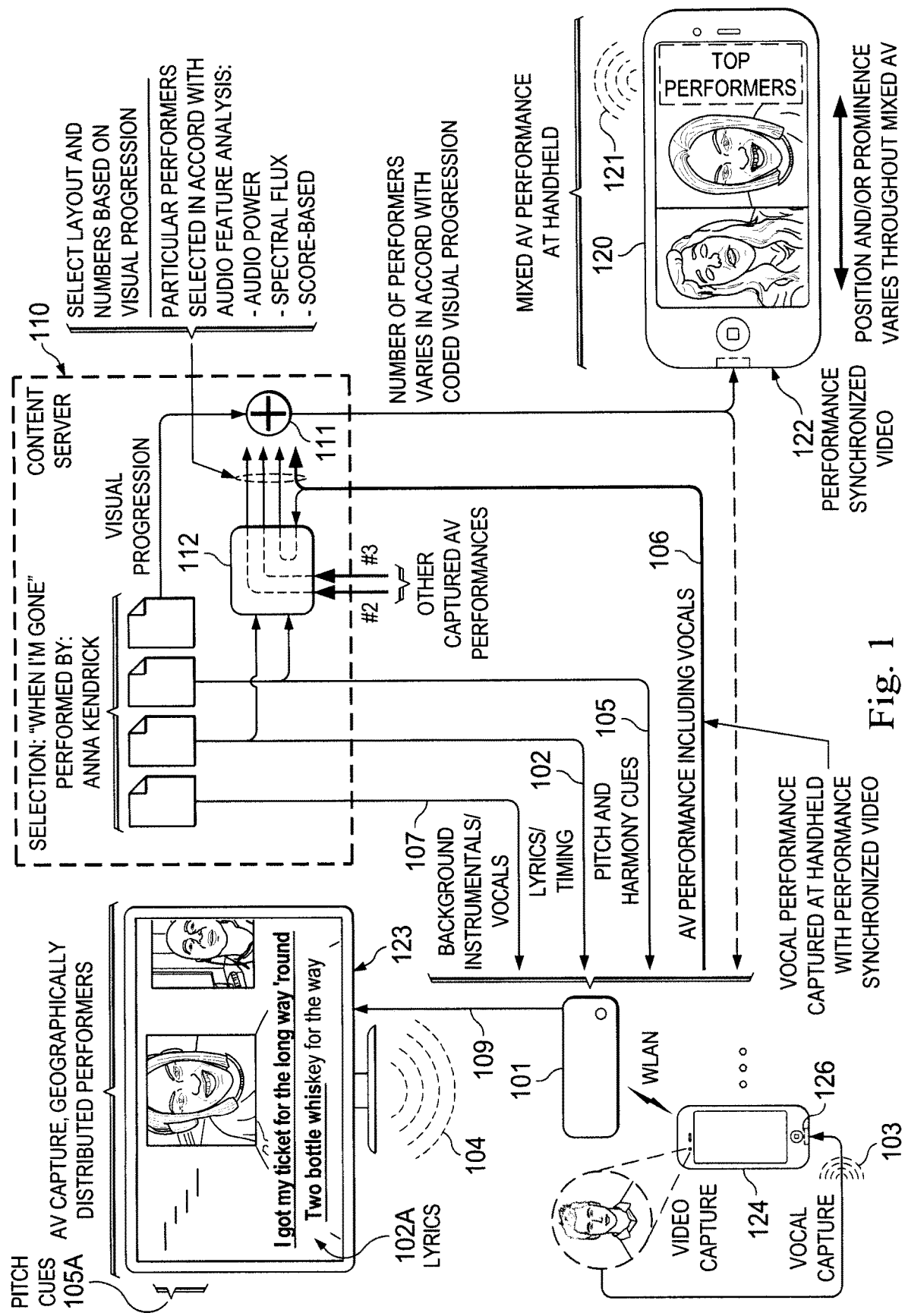
FIG. 1 depicts information flows amongst illustrative mobile phone-type portable computing devices, a display device-connected computing platform and a content server in accordance with some embodiments of the present invention(s) in which one or more of the portable computing devices are paired with the display device-connected computing platform for audiovisual capture.

Skilled artisans will appreciate that elements or features in the drawings are illustrated for simplicity and clarity and have not necessarily been drawn to scale. For example, the dimensions or prominence of some of the illustrated elements or features may be exaggerated relative to other elements or features in an effort to help to improve understanding of embodiments of the present invention.

DETAILED DESCRIPTION

Although some embodiments of the present invention are not necessarily limited thereto, pitch-corrected, karaoke-style, vocal capture provides a useful descriptive context. In some embodiments, a display device-connected computing platform may be utilized and may operate in conjunction with a mobile phone. For example, in some embodiments such as illustrated in FIG. 1, an iPhone® handheld available from Apple Inc. (or more generally, handheld 124) hosts software that executes in coordination with a content server over a network (e.g., the Internet) to provide vocal capture and continuous real-time, score-coded pitch correction and harmonization of the captured vocals.

As a further example, in some embodiments such as illustrated in FIG. 1, a display device-connected computing platform (also referred to herein as a display device-coupled computing platform), such as an AppleTV™ computing platform available from Apple Inc. (or more generally, display device-connected computing platform 101) hosts software (e.g., a media application 460, see FIG. 4) that executes in coordination with a content server 110 to provide vocal capture and continuous real-time, score coded pitch correction and harmonization of the captured vocals. The display device-connected computing platform 101 may be coupled to or connected to a display device, such as a television or display 123. In one embodiment, the display device-connected computing platform operates in conjunction with, or paired with, a handheld 124 in that handheld 124 operates as an audio input device (e.g., exposing its microphone 126 or microphone interface to facilitate vocal capture 103 and, optionally, its camera for video capture) for display device-connected computing platform 101. In some embodiments, the handheld 124 and display device-connected computing platform 101 communicate over a wireless local area network (WLAN) using, in one example embodiment, 802.11 Wi-Fi, and may be paired using a protocol such as Bonjour.

As is typical of karaoke-style applications (such as the "I am T-Pain" application for iPhone originally released in September of 2009, the later-released "Glee" application, or current versions of the Sing! Karaoke application, all available from Smule, Inc.), a backing track of instrumentals and/or vocals can be audibly rendered for a user/vocalist to sing against. In the configuration of FIG. 1, lyrics (102A) may be supplied (102) from content server 100 and displayed via display device-connected computing platform 101 (and display 123) in correspondence with audible rendering (104) so as to facilitate a karaoke-style vocal performance by a user. Pitch and (optionally) harmony cues (105A) may also be supplied (105) from content server 100 and displayed via display device-connected computing platform 101 (and display 123) in correspondence with audible rendering (104). In some cases or situations, backing audio may be rendered from a local store such as from content of an iTunes™ library resident on the handheld, display device-connected computing platform, content server, or on another computing device in communication with the handheld or display device-connected computing platform. In some embodiments, an application executing on the handheld device 124 pairs with the media application executing on the display device-connected computing platform 101 to enable transmission of user vocals (103) and, in some cases, video captured by the handheld device 124 to the display device-connected computing platform 101 for rendering at the display 123. In some cases, audiovisual (AV) signals are transferred (109) between display device-connected computing platform 101 and display 123 using HDMI-type cabling, connections, signaling and protocol standards.

In some cases or embodiments, vocal audio and/or video captured at handheld device 124 is transmitted as AV performance 106 to a content server (e.g., 110) for mixing (112) with other sources of AV content and supply to other devices (e.g., 120). In some cases or embodiments, techniques such as described in one or more of the previously incorporated, commonly-owned and co-pending U.S. patent applications (Ser. Nos. 15/173,041 and 14/928,727) are employed to provide a visual progression or to control position and/or prominence of composite performance synchronized video (122) and audio (121) at a device such as handheld 120 or display device-connected computing platform 101 and display 123.

User vocals 103 captured at handheld device 124 may be pitch-corrected continuously and in real-time (e.g., at the handheld or at the display device-connected computing platform) and audibly rendered (see 104, mixed with backing track 107) to provide the user with an improved tonal quality rendition of his/her own vocal performance. In some cases, an application executing on handheld device 124 prompts the user to orient the handheld device generally upside down, such that the microphone 126 of the mobile device is oriented toward the mouth of the user. In some cases, the application executing on handheld device 124 detects orientation using accelerometer, gyroscope sensor or other facilities of handheld device 124. Pitch correction is typically based on score-coded note sets (e.g., pitch and harmony cues 105), which provide continuous pitch-correction algorithms with performance synchronized sequences of target notes in a current key or scale. In general, pitch cues and/or lyrics may be presented to a user vocalist on either or both of display 123 and handheld device 124, depending on design considerations or user preferences.

In some cases or embodiments, in addition to performance synchronized melody targets, score-coded harmony note sequences (or sets) provide pitch-shifting algorithms with additional targets for pitch-shifting to harmony versions of the user's own captured vocals. Typically, such note sequences or sets are coded as offsets relative to a lead melody note track and typically scored only for selected portions thereof) In some cases, pitch correction settings may be characteristic of a particular artist such as the artist that performed vocals associated with the particular backing track.

In the illustrated embodiment, backing audio (here, one or more instrumental and/or vocal tracks), lyrics and timing information (102) and pitch/harmony cues (105) are all supplied (or demand updated) from one or more content servers or hosted service platforms (here, content server 110). For a given song and performance, such as "When I'm Gone," several versions of the background track (107) may be stored, supplied or demand updated, e.g., on or from content server 110. For example, in some implementations or deployments, versions may include:

uncompressed stereo way format backing track,
uncompressed mono way format backing track and
compressed mono m4a format backing track.

In addition, lyrics, melody and harmony track note sets and related timing and control information may be encapsulated as a score coded in an appropriate container or object (e.g., in a Musical Instrument Digital Interface, MIDI, or Java Script Object Notation, json, type format) for supply together with the backing track(s). Using such information, display device-connected computing platform 101 and/or handheld 124 may display lyrics and even visual cues related to target notes, harmonies and currently detected vocal pitch in correspondence with an audible performance of the backing track(s) so as to facilitate a karaoke-style vocal performance by a user.

Thus, if an aspiring vocalist selects on the handheld device or on the display device-connected computing platform "When I'm Gone" as originally popularized by the singer Anna Kendrick, whenimgone.json and whenimgone.m4a may be downloaded from the content server (if not already available or cached based on prior download) and, in turn, used to provide background music, synchronized lyrics and, in some situations or embodiments, score-coded note tracks for continuous, real-time pitch-correction shifts while the user sings. Optionally, at least for certain embodiments or genres, harmony note tracks may be score coded for harmony shifts to captured vocals. Typically, a captured pitch-corrected (possibly harmonized) vocal performance is saved locally on the handheld device or display device-connected computing platform as one or more way files and is subsequently compressed (e.g., using lossless Apple Lossless Encoder, ALE, or lossy Advanced Audio Coding, AAC, or vorbis codec) and encoded for upload (106) to content server 110 as an MPEG-4 audio, m4a, or ogg container file. MPEG-4 is an international standard for the coded representation and transmission of digital multimedia content for the Internet, mobile networks and advanced broadcast applications. OGG is an open standard container format often used in association with the vorbis audio format specification and codec for lossy audio compression. Other suitable codecs, compression techniques, coding formats and/or containers may be employed if desired.

Depending on the implementation, encodings of dry vocal and/or pitch-corrected vocals may be uploaded (106) to content server 110. In general, such vocals (encoded, e.g., as way, m4a, ogg/vorbis content or otherwise) whether already pitch-corrected or pitch-corrected at content server 110 can then be mixed (111), e.g., with backing audio and other captured (and possibly pitch shifted) vocal performances, to produce files or streams of quality or coding characteristics selected accord with capabilities or limitations a particular target (e.g., handheld 120) or network. For example, pitch-corrected vocals can be mixed with both the stereo and mono way files to produce streams of differing quality. In some cases, a high quality stereo version can be produced for web playback and a lower quality mono version for streaming to devices such as the handheld device or display device-connected computing platform itself.

Performances of multiple vocalists may be accreted in a virtual glee club performance. In some embodiments, one set of vocals (for example, in the illustration of FIG. 1, main vocals captured at display device-connected computing platform 101 in conjunction with handheld 124) may be accorded prominence in the resulting mix. In general, prominence may be accorded (112) based on amplitude, an apparent spatial field and/or based on the chordal position into which respective vocal performance contributions are placed or shifted. In some embodiments, a resulting mix (e.g., pitch-corrected main vocals captured and pitch corrected at display device-connected computing platform 101 and/or handheld 124) mixed with a compressed mono m4a format backing track and one or more additional vocals pitch shifted into harmony positions above or below the main vocals) may be supplied to another user at a remote device (e.g., handheld 120) for audible rendering (121) and/or use as a second-generation backing track for capture of additional vocal performances, in addition to a performance synchronized video 122.

In some embodiments, as described above, handheld 124 operates in conjunction with display device-connected computing platform 101 to serve as an audio input device for media application software hosted on and/or executing on display device-connected computing platform 101. In some embodiments, the coordination, or pairing, between handheld 124 and display device-connected computing platform 101 occurs in a series of steps presented to a user of software hosted on handheld 124 operating in conjunction with software hosted on display device-connected computing platform 101.

In some cases or embodiments, the mixing and presentation of audiovisual performance of multiple vocalists is managed or controlled using user interface features provided by the display device-connected computing platform 101 executing software which displays a karaoke-type media application user interface on television 123. For example, display device-connected computing platform 101 may display on television 123 a globe image or image of the earth on which multiple vocalists are visualized according to their geographic location, and display further user interface features, embellishments, and other indications in correspondence with the vocalist visualizations.

Figure 3:
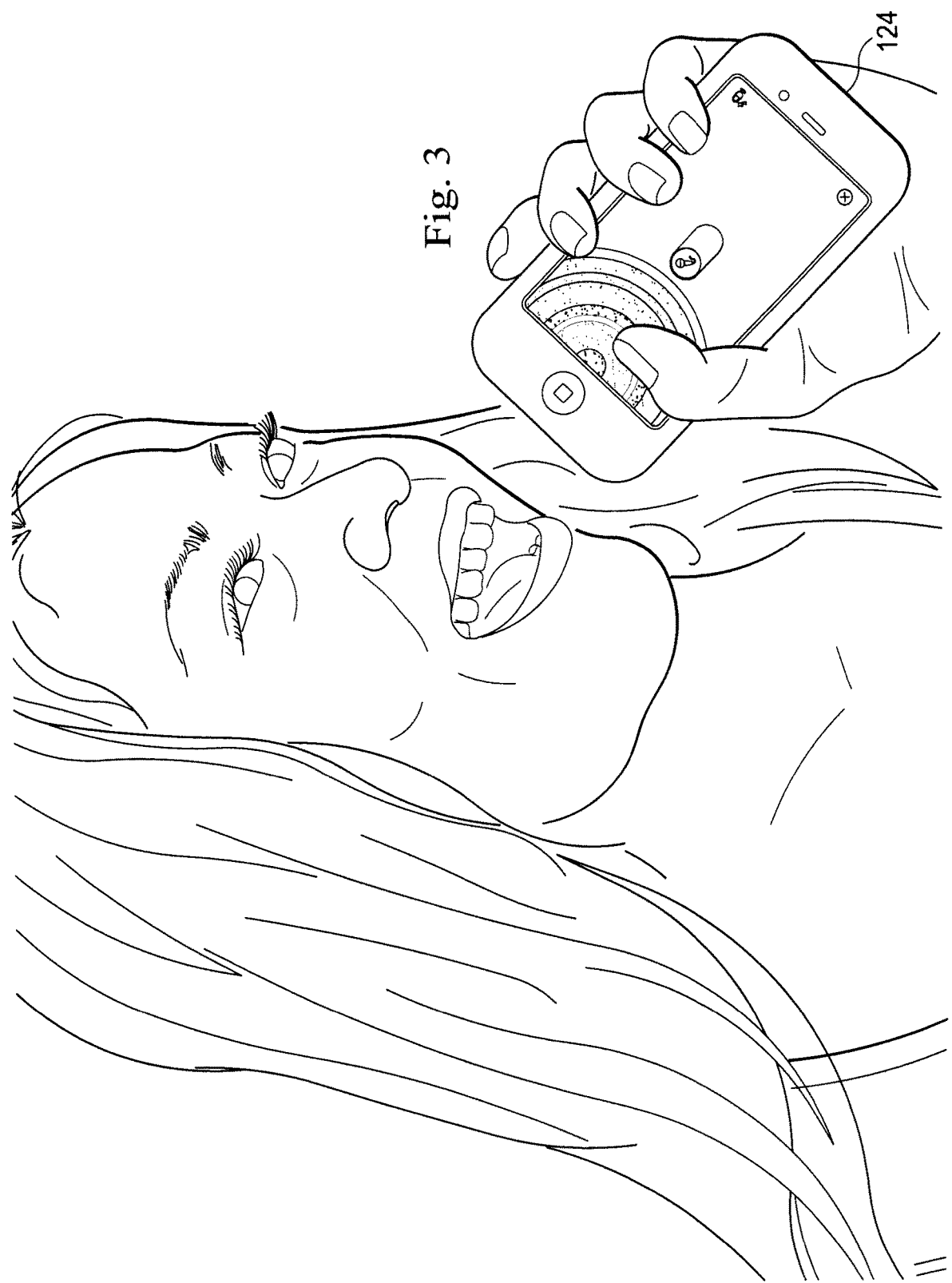
FIG. 3 depicts a user employing a mobile-phone type handheld device paired in accordance with some embodiments of the present invention(s) to provide vocal audio capture in connection with a karaoke-style media application.

User vocals 103 are captured at a handheld device 124. In some embodiments, the handheld device 124 is oriented such that a home or other button on the face of the handheld device 124 is positioned above a receiver (i.e., the speaker for phone calls when the handheld device is used as a mobile phone, typically positioned at a top of the mobile device so as to be near the user's ear) of the handheld device 124. Thus, the microphone of the handheld device 124 is positioned generally closer to the user's mouth. Positioning the microphone in this generally upside-down manner may result in higher audio quality (amplitude, signal-to-noise, fidelity, etc.) for the captured user vocals. FIG. 3 illustrates one such orientation and use in which the user vocalist holds handheld device 124 (here an iPhone-type mobile phone) in a manner that emulates handling of traditional stick microphone.

Figure 2:
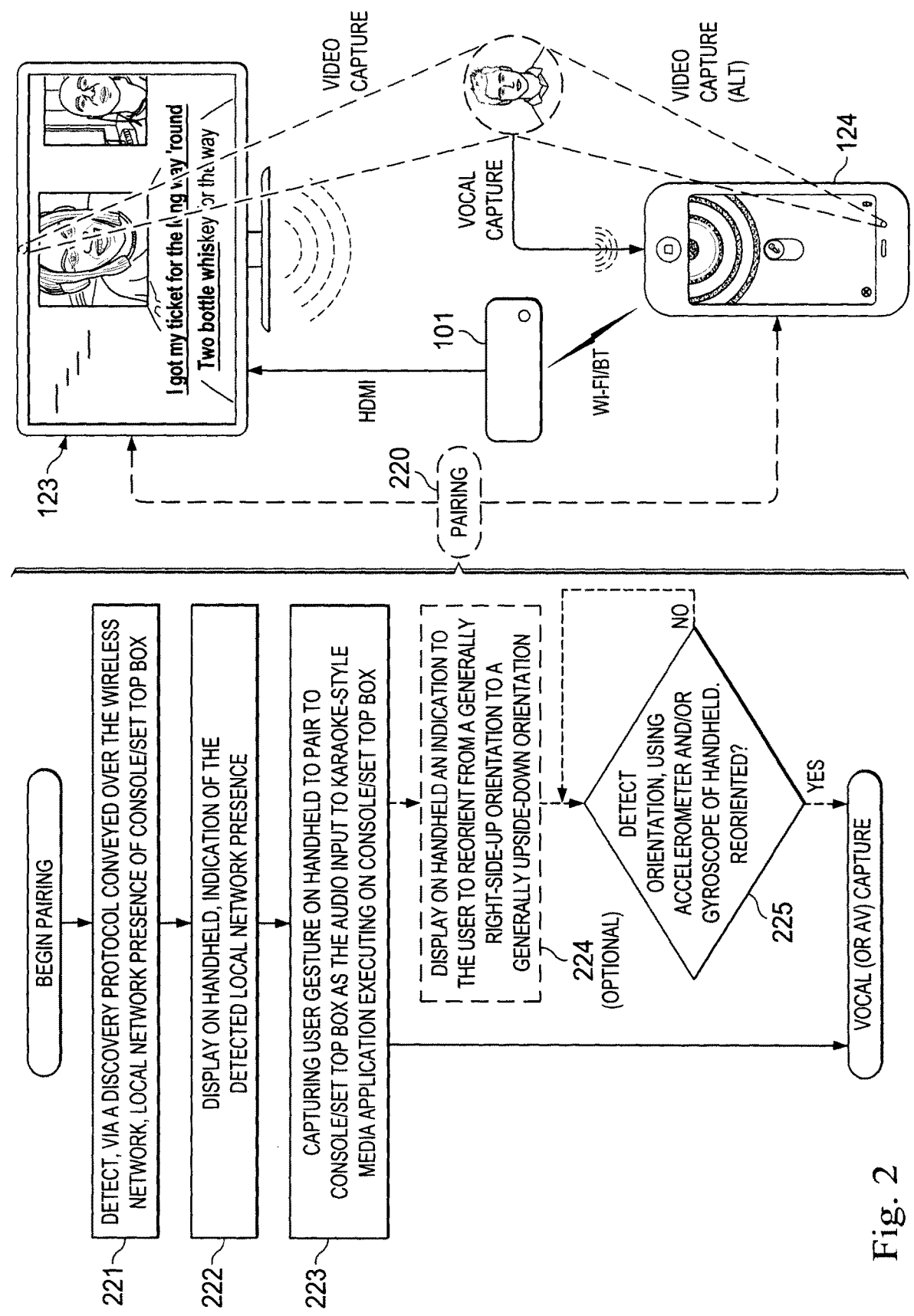
FIG. 2 is a flow chart that depicts a sequence of operations for device pairing in accordance with some embodiments of the present invention(s) to allow a mobile-phone type handheld device to provide vocal audio capture (with or without performance synchronized video) in connection with a karaoke-style media application executing on an illustrative display-coupled, console or set-top box type device.

FIG. 2 is a flow chart that depicts a sequence of operations for device pairing (220) in accordance with some embodiments of the present invention(s) to allow a mobile-phone type handheld device 124 to provide vocal audio capture (with or without performance synchronized video) in connection with a karaoke-style media application executing on an illustrative display-coupled, console or set-top box type device (e.g., console or set-top box 101 HDMI coupled to display 123).

In some cases or embodiment, pairing 220 includes detecting (221) via a discovery protocol (e.g., Bonjour or some other zero-configuration networking technologies that provide service discovery, address assignment, and name resolution). In other cases or embodiments, near field communications, Bluetooth® or other personal area network (PAN) technologies, near-field communications (NFC) and/or even optical or acoustic registrations or signals may be employed to associate and thereafter address one or more mobile devices (e.g., phones or portable media devices) with a display device coupled computing platform that hosts a karaoke-style media application. An indication of the detected (or identified) local network presence may be displayed (222) on handheld 124 to facilitate pairing and, based on a captured user gesture (223), the illustrated method may pair handheld 124 with console or set-top box 101 as an audio input to a karaoke-style media application executing thereon.

Optionally and dependent on the microphone pickup configuration of handheld 124, an indication may be displayed (224) on a display of handheld directing the user to reorient handheld 124 from a generally right-side-up orientation to a generally upside-down orientation so as to more directly present the microphone for high-quality vocal capture. FIG. 3 illustrates one such orientation and microphone presentation that may be prompted. Referring again to FIG. 2, in some cases or embodiments, the orientation of handheld 124 may be detected (225) using accelerometer and/or gyroscope of the handheld device. Feedback from such sensors or devices may be used to confirm proper orientation and/or to provide the user with corrective visual, audible or haptic feedback.

Figure 6:
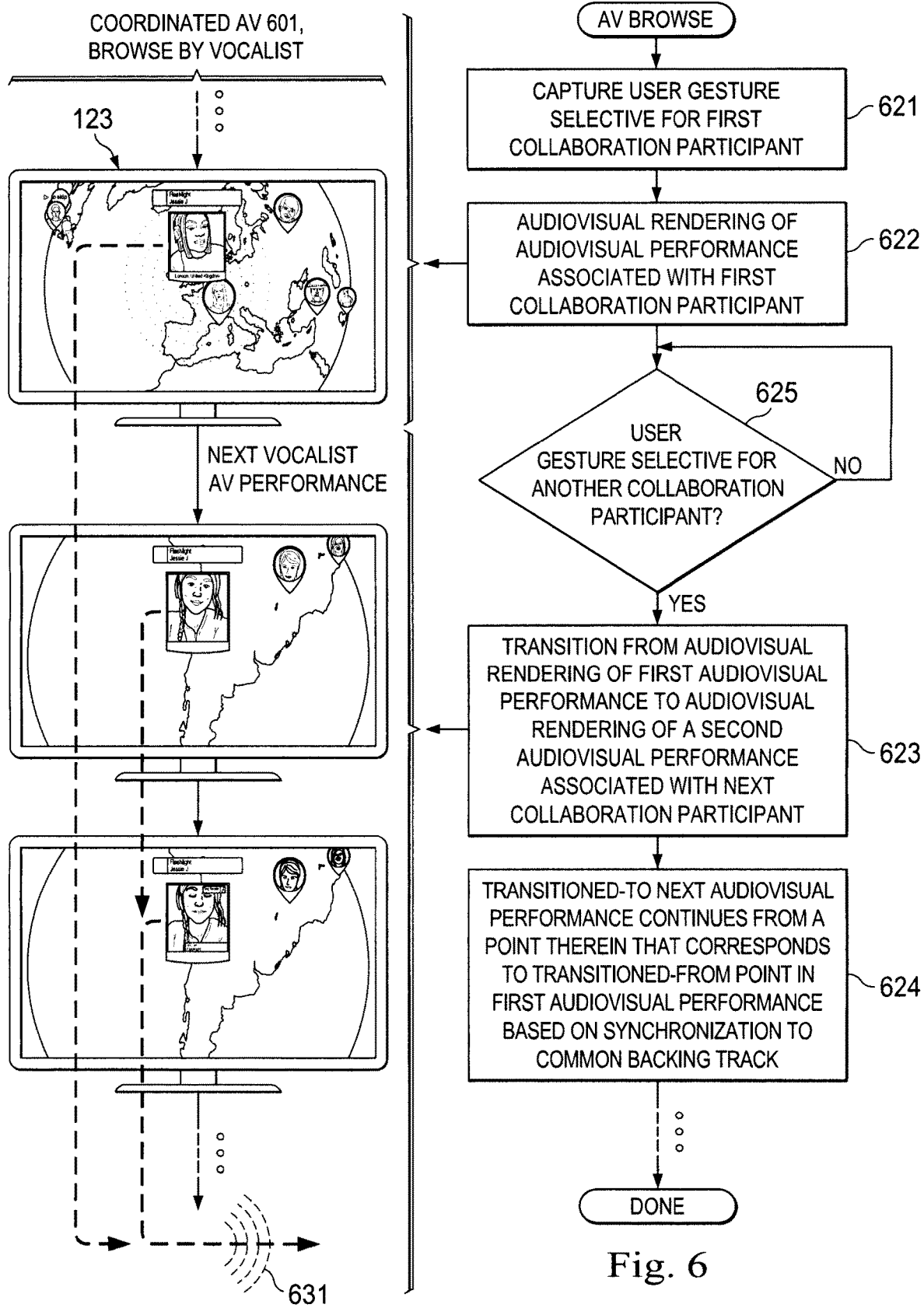
FIG. 6 is a flow chart that depicts a sequence of operations and exemplary visual depiction for a browse-by-vocalist function in accordance with some embodiments of the present invention(s) to provide a generally seamless transition from coordinated audiovisual performance content of one vocalist to another based on synchronization to a common backing track.

FIG. 6 is a flow chart that depicts a sequence of operations and exemplary visual depiction for a browse-by-vocalist function in accordance with some embodiments of the present invention(s). The functionality depicted provides a generally seamless transition from coordinated audiovisual performance content of one vocalist to another based on synchronization to a common backing track. Based on user interface gestures captured at either display device-connected computing platform 123 or handheld 124 (not specifically shown in FIG. 6, but recall FIGS. 1 and 2), audiovisual content of various vocalists is sequentially presented based on a performance timeline keyed to the backing track against which vocals for the respective vocalists were captured. Thus, a coordinated audiovisual performance 601 is audibly and visually rendered (e.g., 622, 624) with transitions (e.g., 623) from captured audiovisual content of one vocalist to another vocalist triggered by browse indicative gestures of a user (see 621, 625). The transitioned-to next audiovisual performance continues from a point therein that corresponds to a transitioned-from point in the prior audiovisual performance and is based on synchronization to a common backing track. Note that, for simplicity of illustration, a single vocalist at time presentation is illustrated; however, persons of skill in the art having benefit of the present disclosure will appreciate that audiovisuals for multiple vocalists may be concurrently rendered in some cases or embodiments.

In the exemplary visual depiction of FIG. 6, a performance synchronized video of the current vocalist is presented on-screen in a popup window visually anchored to a vocalist-associated geocoded position on a globe. Other vocalists having associated geocoded positions within a current geographic view and for whom audiovisual content is available (and synchronizable to the common backing track) are also presented on screen with teardrop style icons on the globe for selection and transitioning based on a selective user gestures. Rendered audio 631 presents audio for a sequence of vocalists in correspondence with user gestured selections, together with performance synchronized video for the vocalists so selected.

Although the exemplary browse visually depicted in FIG. 6 is based on a geolocation index into browsable content, persons of skill in the art having benefit of the present disclosure will appreciate that alternative browse modes and depictions need not anchor to geolocation. For example, in some alternative browse modes, presentation of browsable content may be based on social network proximity measures, popularity in a given community, browse history, computationally (or user community) rated quality of performances, etc. Indeed, globe-based geolocations may be omitted in some browse modes, particularly where a current set or selection of available audiovisual content is not globally sourced.

Figure 4:
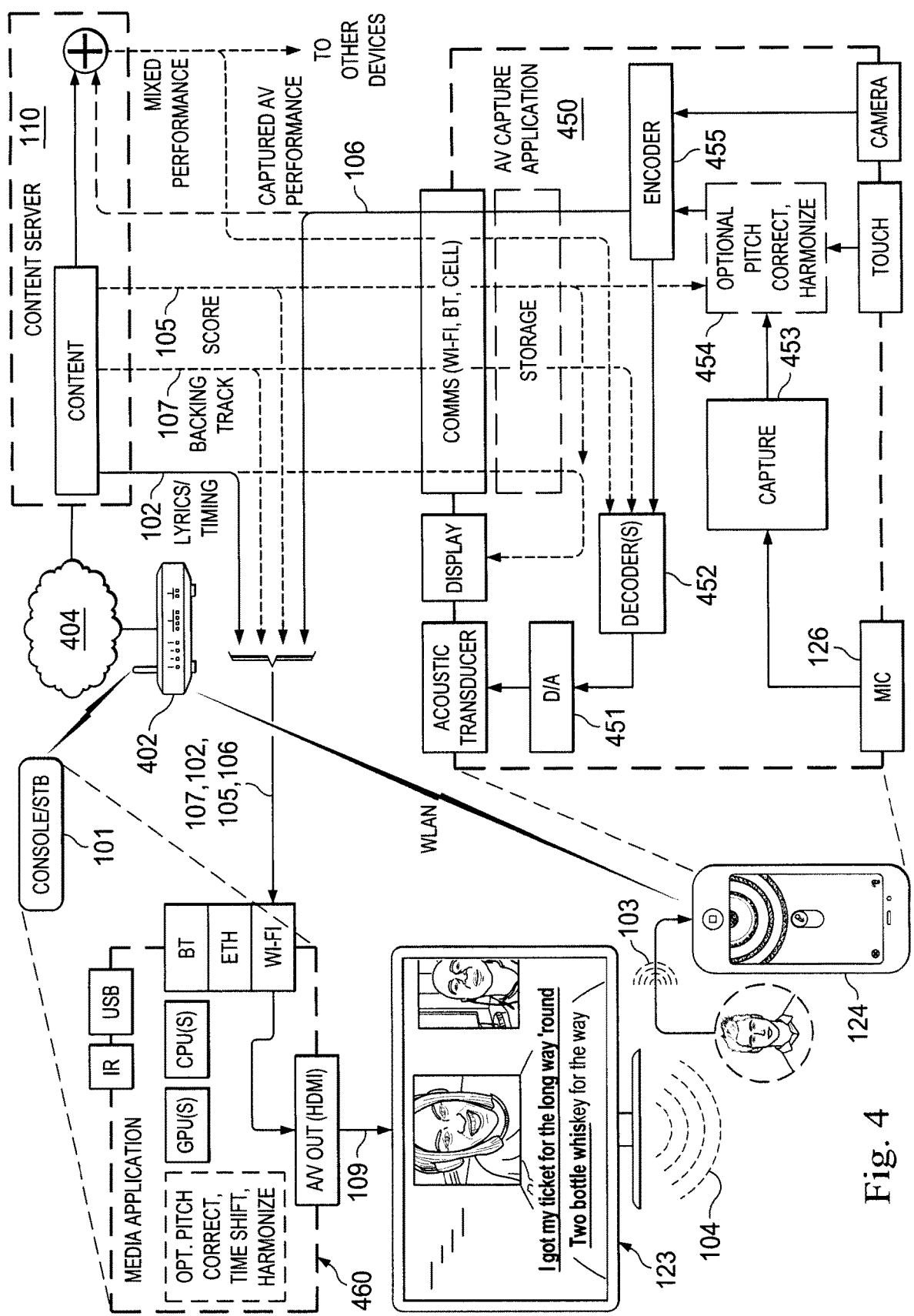
FIG. 4 depicts information flows and operations within and amongst illustrative devices of a system configured to support a karaoke-style media application in accordance with some embodiments of the present invention(s).

FIG. 4 depicts information flows and operations within and amongst illustrative devices of a system configured to support a karaoke-style media application (460) hosted by and executing on a console or set-top box type device 101 using an audiovisual capture application (450) executing on a paired handheld device 124. User vocals (103) captured (453) via microphone interface (126) of handheld device 124 may be encoded (455) for transmission to content server 110 (via wide-area network 404) and to the karaoke-style media application (460) executing on console/set-top box 101. In some embodiments, captured vocals are transmitted over a local area network to a display device-connected computing platform (e.g., console/set-top box 101). Audiovisual capture application 460 may optionally support real-time continuous pitch correction (454), e.g., in accordance with a musical score (105) received from content server 110 (via wide-area network 404, router/access point 402 and the wireless local area network WLAN). Likewise, backing tracks (107) as well as lyrics and timing information (102) received from content server 110 may be used to provide a karaoke-type experience at handheld device 124.

In some embodiments, the local area network is a wireless local area network coupling the handheld device 124 to a wireless access point and router, and then to the display device-connected computing platform (whether wired or wirelessly). Upon receipt of the vocals from the handheld device 124, the display device-connected computing platform (e.g., console/set-top box 101) may itself pitch correct, time shift, harmonize, or perform other transformations on the captured and received vocals (see media application 460). In some modes of operation, encoded audio information may be decoded (452) and used to drive (see D/A 451) an audible rendering via an acoustic transducer or audio signal interface of handheld device 124. In some modes of operation, similar or analogous vocal audio signals or encodings, together with performance synchronized (or synchronizable) video, are conveyed over the wireless local area network (WLAN) and output via an audio/visual output interface of the display device-connected computing platform, such as via an HDMI output 109.

Display device 123, which may include a television or other display, audibly and visually renders (104) an audiovisual performance mix that includes a backing audio track (107) and the user's captured audiovisual performance (106), potentially coordinated with captured audiovisual performances of other users. In some cases or embodiments, the display device-connected computing platform 101 may process and transmit user vocals to content server 110 via wide area network 404. Additionally, vocal performances of collaborators may be rendered by the display device. Backing tracks (107), collaborator vocal performances, mixed performances, lyrics for display (102), timings, scores (105), and other data may be received from content server 110 over a wide area network such as the Internet.

Figure 5:
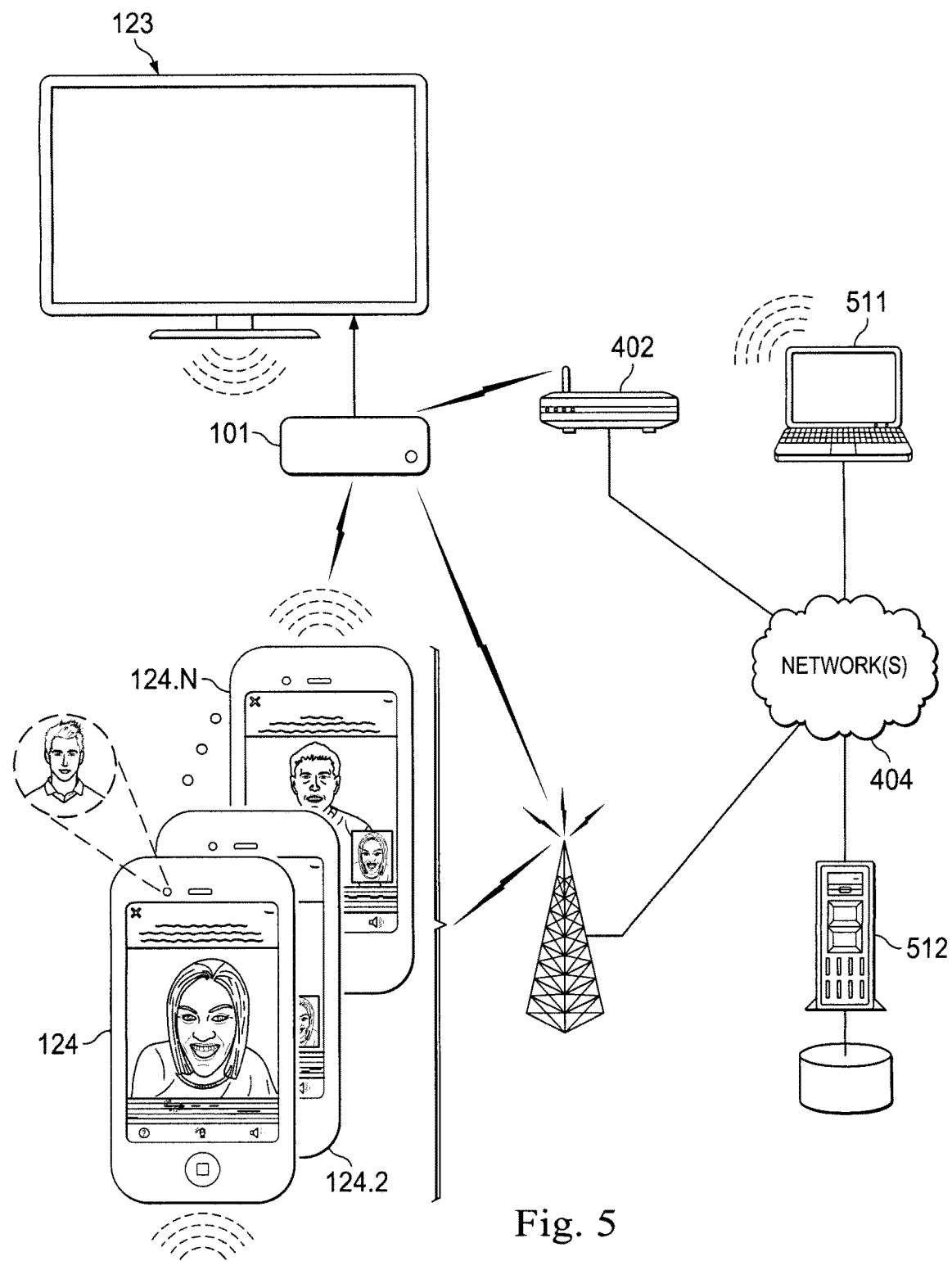
FIG. 5 is a network diagram that illustrates cooperation of exemplary devices in accordance with some embodiments of the present invention(s).

FIG. 5 is a network diagram that illustrates interconnection cooperation of exemplary devices in accordance with some system-level embodiments of the present invention(s) is described. Various devices, including, but not limited to, display device-connected computing platforms such a console/set-top box 101 and display device 123, handheld devices 124, 124.2 . . . 124.N, networks 404, servers 512 (which may include content servers or service platforms, such as content server 110), portable computing devices 511, and other such devices, operate in coordination in accordance with some embodiments of the present invention(s) described herein.

Karaoke Applications and Social Music, Generally

In general, for a given song, aspects of the song's musical structure can be used to create a mapped sequence of visual layouts. For example, in some cases, situations or embodiments, song form, such as {verse, chorus, verse, chorus, bridge . . . }, is used to constrain the mapping. In some cases, such as in a duet, vocal part sequencing (e.g., you sing a line, I sing a line, you sing two words, I sing three, we sing together . . . ) provides structural information that is used to create a sequence of visual layouts. In some cases, situations or embodiments, building intensity of a song (e.g., as measured by acoustic power, tempo or some other measure) can result in a sequence of visual layouts that adds greater and greater numbers of vocalists in correspondence with measured intensity.

Optionally, and in some cases or embodiments, vocal audio can be pitch-corrected in real-time at the mobile device (or more generally, at a portable computing device such as a mobile phone, personal digital assistant, laptop computer, notebook computer, pad-type computer or netbook) in accord with pitch correction settings, or at the display device-connected computing platform, in accord with pitch correction settings. Alternatively, or additionally, pitch correction can be performed using CPU and GPU facilities of a video console or set-top box. In some cases, pitch correction settings code a particular key or scale for the vocal performance or for portions thereof. In some cases, pitch correction settings include a score-coded melody and/or harmony sequence supplied with, or for association with, the lyrics and backing tracks. Harmony notes or chords may be coded as explicit targets or relative to the score coded melody or even actual pitches sounded by a vocalist, if desired. Machine usable musical instrument digital interface-style (MIDI-style) codings may be employed for lyrics, backing tracks, note targets, vocal parts (e.g., vocal part 1, vocal part 2, . . . together), musical section information (e.g., intro/outro, verse, pre-chorus, chorus, bridge, transition and/or other section codings), etc. In some cases or embodiments, conventional MIDI-style codings may be extended to also encode a score-aligned, visual progression of mappings to visual cells of a succession of template screen layouts or to control position and/or prominence of composite performance synchronized video and audio, as described in in one or more of the previously-incorporated, commonly-owned and co-pending U.S. patent applications (Ser. No. 15/173, 041 and 14/928,727).

Based on the compelling and transformative nature of the pitch-corrected vocals, performance synchronized video and score-coded harmony mixes, user/vocalists may overcome an otherwise natural shyness or angst associated with sharing their vocal performances. Instead, a living room full of amateurs and even geographically distributed vocalists are encouraged to share with friends and family or to collaborate and contribute vocal performances as part of social music networks. In some implementations, these interactions are facilitated through social network- and/or eMail-mediated sharing of performances and invitations to join in a group performance. Using uploaded vocals captured at clients such as the aforementioned portable computing devices, a content server (or service) can mediate such coordinated performances by manipulating and mixing the uploaded audiovisual content of multiple contributing vocalists. Depending on the goals and implementation of a particular system, in additional to video content, uploads may include pitch-corrected vocal performances (with or without harmonies), dry (i.e., uncorrected) vocals, and/or control tracks of user key and/or pitch correction selections, etc.

Social music can be mediated in any of a variety of ways. For example, in some implementations, a first user's vocal performance, captured against a backing track at a portable computing device and typically pitch-corrected in accord with score-coded melody and/or harmony cues, is supplied to other potential vocal performers. Performance synchronized video is also captured and may be supplied with the pitch-corrected, captured vocals. The supplied vocals are typically mixed with backing instrumentals/vocals and form the backing track for capture of a second (and potentially successive) user's vocals. Often, the successive vocal contributors are geographically separated and may be unknown (at least a priori) to each other, yet the intimacy of the vocals together with the collaborative experience itself tends to minimize this separation. As successive vocal performances and video are captured (e.g., at respective portable computing devices) and accreted as part of the social music experience, the backing track against which respective vocals are captured may evolve to include previously captured vocals of other contributors.

In some cases, captivating visual animations and/or facilities for listener comment and ranking, as well as duet, glee club or choral group formation or accretion logic are provided in association with an audible rendering of a vocal performance (e.g., that captured and pitch-corrected at another similarly configured mobile device or display device-connected computing platform) mixed with backing instrumentals and/or vocals. Synthesized harmonies and/or additional vocals (e.g., vocals captured from another vocalist at still other locations and optionally pitch-shifted to harmonize with other vocals) may also be included in the mix. Geocoding of captured vocal performances (or individual contributions to a combined performance) and/or listener feedback may facilitate animations or display artifacts in ways that are suggestive of a performance or endorsement emanating from a particular geographic locale on a user manipulable globe. In this way, implementations of the described functionality can transform otherwise mundane mobile devices and/or display device-connected computing platforms into social instruments that foster a unique sense of global connectivity, collaboration and community.

OTHER EMBODIMENTS

While the invention(s) is (are) described with reference to various embodiments, it will be understood that these embodiments are illustrative and that the scope of the invention(s) is not limited to them. Many variations, modifications, additions, and improvements are possible. For example, while particular styles, types and encodings of audiovisual content and particular home-entertainment system-oriented configurations are illustrated and described, persons of skill in the art having benefit of the present disclosure will appreciate variations and adaptions suitable for a given deployment, implementation, musical genre or user demographic. Likewise, while pitch correction of vocal performances captured in accord with a karaoke-style interface have been described, other variations and adaptations will be appreciated. Furthermore, while certain illustrative signal processing techniques have been described in the context of certain illustrative applications and device/system configurations, persons of ordinary skill in the art will recognize that it is straightforward to modify the described techniques to accommodate other suitable signal processing techniques and effects.

Embodiments in accordance with the present invention may take the form of, and/or be provided as, a computer program product encoded in a machine-readable medium as instruction sequences and other functional constructs of software, which may in turn be executed in a computational system (such as a iPhone handheld, mobile or portable computing device, or content server platform) to perform methods described herein. In general, a machine readable medium can include tangible articles that encode information in a form (e.g., as applications, source or object code, functionally descriptive information, etc.) readable by a machine (e.g., a computer, computational facilities of a mobile device or portable computing device, etc.) as well as tangible storage incident to transmission of the information. A machine-readable medium may include, but is not limited to, magnetic storage medium (e.g., disks and/or tape storage); optical storage medium (e.g., CD-ROM, DVD, etc.); magneto-optical storage medium; read only memory (ROM); random access memory (RAM); erasable programmable memory (e.g., EPROM and EEPROM); flash memory; or other types of medium suitable for storing electronic instructions, operation sequences, functionally descriptive information encodings, etc.

In general, plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the invention(s). In general, structures and functionality presented as separate components in the exemplary configurations may be implemented as a combined structure or component. Similarly, structures and functionality presented as a single component may be implemented as separate components. These and other variations, modifications, additions, and improvements may fall within the scope of the invention(s).

What is claimed is:

1. A method comprising:
   establishing short-range wireless communications between a portable computing device and a display device-coupled computing platform, the display device-coupled computing platform in communication with a separate content server;
   using the portable computing device as a wirelessly coupled audio and video capture interface for the display device-coupled computing platform while the display device-coupled computing platform provides pitch cues and an audibly rendered backing track in temporal correspondence with the pitch cues;

detecting, at least for audio capture modes of operation, an orientation of the portable computing device, and in response to the detected orientation, displaying on a touchscreen of the portable computing device an indication to a user of the portable computing device to reorient the portable computing device from a generally right-side-up orientation to a generally upside-down orientation, wherein the generally upside-down orientation orients a microphone of the portable computing device toward the user's mouth;

capturing, via the microphone of the portable computing device, vocal audio from the user of the portable computing device;

capturing, via a camera of the portable computing device, a user video synchronized with the captured vocal audio; and visually rendering, on a display device of the display device-coupled computing platform, the pitch cues and lyrics in temporal correspondence with the audibly rendered backing track, wherein the display device of the display device-coupled computing platform is separate from the portable computing device.

2. The method of claim 1, wherein the visually rendering further comprises:

visually rendering, on the display device of the display device-coupled computing platform, a sequence of visual layouts including the pitch cues and the lyrics in temporal correspondence with the audibly rendered backing track, a first visual cell displaying a first user video synchronized with the captured vocal audio, and a second visual cell displaying a second user video synchronized with the captured vocal audio, wherein successive visual layouts of the sequence of visual layouts each include the first and second visual cells, and wherein a visual arrangement and sizing of the first and second visual cells varies in correspondence with structural information associated with the audibly rendered backing track.

3. The method of claim 2, wherein the orientation detecting is via one or more of a gyroscopic sensor and an accelerometer of the portable computing device.

4. The method of claim 2, further comprising:

displaying, in the generally right-side-up orientation, first display content including the indication to reorient the portable computing device; and responsive to detection of a change in orientation of the portable computing device, displaying in the generally up-side-down orientation, second display content including one or more user interface controls for audio capture.

5. The method of claim 4, wherein transition from the first display content to the second display content includes a rotational transformation of at least some visual feature of first display content.

6. The method of claim 2, wherein the indication to reorient includes a dynamic on-screen visual of complementary semi-circular arrows.

7. The method of claim 4, wherein the one or more user interface controls for audio capture include a user interface control for muting the microphone of the portable computing device; and wherein, responsive to user gestures on the touchscreen, an operating mode changes between (i) a first user interface state wherein captured vocal audio is transmitted to the display device-coupled computing platform over the wireless network and (ii) a second user interface state wherein vocal audio is not transmitted.

8. The method of claim 2, further comprising:

visually rendering, on the touchscreen display of the portable computing device, cues corresponding to the amplitude of the captured vocal audio.

9. A computer program product including non-transitory media encoding instructions executable in connection with the method of claim 2 to detect orientation of the portable computing device and to wirelessly transmit captured vocal audio to the display device-coupled computing platform.

10. The method of claim 2, wherein the vocal audio from the user is captured in temporal correspondence with the audibly rendered backing track.

11. The method of claim 2, further comprising:

pitch correcting the captured vocal audio in real-time, wherein the pitch correcting the captured vocal audio in real-time is performed by the portable computing device.

12. The method of claim 2, further comprising:

pitch correcting the captured vocal audio in real-time, wherein the pitch correcting the captured vocal audio in real-time is performed by the display device-coupled computing platform.

13. The method of claim 2, further comprising:

pitch correcting the captured vocal audio in real-time; and audibly rendering, at the display device-coupled computing platform, the pitch-corrected vocal audio.

14. The method of claim 2, wherein the user of the portable computing device is a first user, and wherein the captured user video is the first user video.

15. The method of claim 2, wherein the user of the portable computing device is a second user, and wherein the captured user video is the second user video.

16. The method of claim 1, wherein the detecting further comprises:

detecting, at least for the audio capture modes of operation, a different orientation of the portable computing device, and in response to the detected different orientation, using the portable computing device to provide corrective feedback to the user.

* * * * *